United States Patent
Nakadai et al.

(10) Patent No.: US 10,748,544 B2
(45) Date of Patent: Aug. 18, 2020

(54) VOICE PROCESSING DEVICE, VOICE PROCESSING METHOD, AND PROGRAM

(71) Applicant: HONDA MOTOR CO., LTD., Tokyo (JP)

(72) Inventors: Kazuhiro Nakadai, Wako (JP); Tomoyuki Sahata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 15/934,372

(22) Filed: Mar. 23, 2018

(65) Prior Publication Data

US 2018/0286411 A1 Oct. 4, 2018

(30) Foreign Application Priority Data

Mar. 29, 2017 (JP) .................................. 2017-065932

(51) Int. Cl.
*G10L 21/028* (2013.01)
*G10L 17/20* (2013.01)
(Continued)

(52) U.S. Cl.
CPC ............ *G10L 17/20* (2013.01); *G01S 3/8006* (2013.01); *G10L 17/00* (2013.01); *G10L 21/028* (2013.01);
(Continued)

(58) Field of Classification Search
CPC ... G10L 15/08; G10L 15/265; G10L 21/0208; G10L 21/0272; G10L 15/1815; G10L 21/02; G10L 15/26; G10L 17/00; G10L 25/51; G10L 25/78; H04M 3/42221; H04M 3/567; H04M 3/569; H04M 2201/41;
(Continued)

(56) References Cited

U.S. PATENT DOCUMENTS 7,366,662 B2 * 4/2008 Visser ................. G10L 21/0208
704/227
7,710,654 B2 * 5/2010 Ashkenazi ......... G02B 27/0093
345/7

(Continued)

FOREIGN PATENT DOCUMENTS

JP 2007-233239 A 9/2007
JP 2012-042953 3/2012
JP 2017-009700 A 1/2017

OTHER PUBLICATIONS

Japanese Office Action with English Translation dated Nov. 20, 2018, 4 pages.

*Primary Examiner* — Vijay B Chawan
(74) *Attorney, Agent, or Firm* — Rankin, Hill & Clark LLP (57) ABSTRACT

A voice processing device includes: a sound source localization unit configured to determine a direction of each sound source on the basis of voice signals of a plurality of channels; a sound source separation unit configured to separate signals for respective sound sources indicating components of respective sound sources from the voice signals of the plurality of channels; a speech section detection unit configured to detect a speech section in which the number of speakers is 1 from the signals for respective sound sources; and a speaker identification unit configured to identify a speaker on the basis of the signals for respective sound sources in the speech section.

9 Claims, 4 Drawing Sheets (51) Int. Cl.
  *G10L 21/0232* (2013.01)
  *G10L 17/00* (2013.01)
  *G01S 3/80* (2006.01)
  *G10L 15/26* (2006.01)
  *G10L 21/0272* (2013.01)
  *G06K 9/00* (2006.01)
  *G10L 25/78* (2013.01)

(52) U.S. Cl.
  CPC ...... *G10L 21/0232* (2013.01); *G06K 9/00228* (2013.01); *G10L 15/26* (2013.01); *G10L 21/0272* (2013.01); *G10L 25/78* (2013.01)

(58) Field of Classification Search
  CPC ... G06F 17/241; G06F 17/27; H04L 12/1831; H04L 12/1822; H04L 12/1827; H04L 51/12
  USPC .... 704/201, 227, 233, 235, 270; 379/203.01
  See application file for complete search history.

(56) References Cited

U.S. PATENT DOCUMENTS

| | | | |
|---|---|---|---|
| 9,913,064 B2* | 3/2018 | Peters | H04S 5/00 |
| 9,934,779 B2* | 4/2018 | Mizumoto | G10L 15/08 |
| 2005/0060142 A1* | 3/2005 | Visser | G10L 21/0208 704/201 |
| 2006/0238877 A1* | 10/2006 | Ashkenazi | G02B 27/0093 359/630 |
| 2007/0038442 A1* | 2/2007 | Visser | G10L 21/0208 704/233 |
| 2007/0129942 A1* | 6/2007 | Ban | G06F 17/241 704/235 |
| 2011/0029893 A1* | 2/2011 | Roberts | G06Q 10/10 715/753 |
| 2012/0002798 A1* | 1/2012 | Chen | H04L 12/1827 379/203.01 |
| 2014/0081643 A1* | 3/2014 | John | G06F 17/27 704/270 |
| 2014/0258413 A1* | 9/2014 | Brieskorn | H04M 3/567 709/204 |
| 2015/0163382 A1* | 6/2015 | Kwong | G06F 1/1637 348/375 |
| 2016/0307571 A1* | 10/2016 | Mizumoto | G10L 25/51 |
| 2017/0263245 A1* | 9/2017 | Mizumoto | G10L 15/08 |

* cited by examiner

VOICE PROCESSING DEVICE, VOICE PROCESSING METHOD, AND PROGRAM

CROSS-REFERENCE TO RELATED APPLICATION

Priority is claimed on Japanese Patent Application No. 2017-065932 filed Mar. 29, 2017, the content of which is incorporated herein by reference.

BACKGROUND OF THE INVENTION

Field of the Invention

The present invention relates to a voice processing device, a voice processing method, and a program.

Description of Related Art

Conventionally, a speaker identification technology for identifying a speaker who speaks on the basis of collected voice signals has been proposed. A speaker identification technology may be used in a situation such as a conversation or a meeting in which, among a plurality of speakers, any speaker who is speaking is identified. Characteristics of voices of speakers overlap in voice signals of one channel collected in a situation in which a plurality of speakers simultaneously speak, and thus speaker identification may fail.

Accordingly, speaker identification using a signal for each sound source which indicates a component separated for each speaker through a sound source separation technique may be conceived. For example, a sound source separation technique disclosed in Japanese Patent Application, First Publication No. 2012-042953 (referred to as Patent Document 1 hereinafter) can be used. Patent Document 1 discloses a sound source separation device which estimates a sound source direction on the basis of input signals of a plurality of channels and calculates a separation matrix on the basis of a transfer function according to the estimated sound source direction. This sound source separation device multiplies an input signal vector having an input signal of each channel as an element by the calculated separation matrix to calculate an output signal vector having output signals as elements. Each element of the calculated output signal vector indicates a voice of each sound source.

SUMMARY OF THE INVENTION

However, the sound source separation technique has a defective setting issue in that an output depends on initial inputs and various parameters used for processing. Accordingly, collected voice signals may not be completely separated into components according to the speech of speakers. In addition, distortion of speech voices and a decrease in a signal-to-noise (SN) ratio may occur in an output acquired according to sound source separation. Hence, there still remains a possibility of failure of speaker identification in a section in which a plurality of speakers simultaneously speak.

An object of embodiments according to the present invention devised to solve the problem is to provide a voice processing device, a voice processing method, and a program which can identify a speaker more accurately.

To accomplish the aforementioned object, the present invention employs the following embodiments.

(1) A voice processing device according to an embodiment of the present invention includes: a sound source localization unit configured to determine a direction of each sound source on the basis of voice signals of a plurality of channels; a sound source separation unit configured to separate signals for respective sound sources indicating components of respective sound sources from the voice signals of the plurality of channels; a speech section detection unit configured to detect a speech section in which a number of speakers is 1 from the signals for respective sound sources; and a speaker identification unit configured to identify a speaker on the basis of the signals for respective sound sources in the speech section.

(2) In the embodiment (1), the speech section detection unit may detect the speech section from sections in which a number of sound sources, of which directions are determined by the sound source localization unit, is 1.

(3) In the embodiment (1) or (2), the speaker identification unit may estimate speakers of speech sections, in which directions of sound sources determined by the sound source localization unit are within a predetermined range, to be identical.

(4) In any one of the embodiments (1) to (3), the voice processing device may include an image processing unit configured to determine a direction of a speaker on the basis of a captured image, and the speaker identification unit may select sound sources, for which the direction of the speaker determined by the image processing unit is within a predetermined range, from a direction of each sound source determined by the sound source localization unit and detect the speech section from sections in which a number of selected sound sources is 1.

(5) In any one of the embodiments (1) to (4), the voice processing device includes a voice recognition unit configured to perform a voice recognition process on the signals for respective sound sources, and the voice recognition unit may provide speech information indicating contents of speech to each speaker determined by the speaker identification unit.

(6) A voice processing method in a voice processing device according to an embodiment of the present invention includes: a sound source localization step of determining a direction of each sound source on the basis of voice signals of a plurality of channels; a sound source separation step of separating signals for respective sound sources indicating components of respective sound sources from the voice signals of the plurality of channels; a speech section detection step of detecting a speech section in which a number of speakers is 1 from the signals for respective sound sources; and a speaker identification step of identifying a speaker on the basis of the signals for respective sound sources in the speech section.

(7) A program according to an embodiment of the present invention causes a computer of a voice processing to execute: a sound source localization process of determining a direction of each sound source on the basis of voice signals of a plurality of channels; a sound source separation process of separating signals for respective sound sources indicating components of respective sound sources from the voice signals of the plurality of channels; a speech section detection process of detecting a speech section in which a number of speakers is 1 from the signals for respective sound sources; and a speaker identification process of identifying a speaker on the basis of the signals for respective sound sources in the speech section.

According to the aforementioned embodiment (1), (6) or (7), a speaker is identified on the basis of signals for respective sound sources in a speech section in which the number of speakers is 1 and components of speech voices of other speakers are not mixed therewith. In addition, distortion with respect to components of speech voice due to sound source separation does not occur in a speech section in which the number of speakers is 1. Accordingly, a speaker is correctly identified.

According to the aforementioned embodiment (2), a section in which there is a single speaker who is speaking is identified in response to speech state change even in a situation in which there are a plurality of speakers. Accordingly, a larger number of sections are used as sections in which a speaker can be correctly identified for speaker identification.

According to the aforementioned embodiment (3), speaker identification can be performed in consideration of the fact that a direction of a speaker does not considerably change within a short time. Accordingly, it is possible to identify a speaker more accurately.

According to the aforementioned embodiment (4), speech information indicating the contents of speech of speech voice is provided to each speaker who has been correctly identified. Accordingly, an operation of editing the contents of speech for each speaker is reduced.

According to the aforementioned embodiment (5), a section in which there is a single speaker who is speaking in a direction in which speakers are actually present is used for speaker identification. Accordingly, it is possible to avoid identification error due to utilization of sound sources other than the speaker for speaker identification.

DETAILED DESCRIPTION OF THE INVENTION

First Embodiment

Hereinafter, a first embodiment of the present invention will be described with reference to the drawings.

Figure 1:
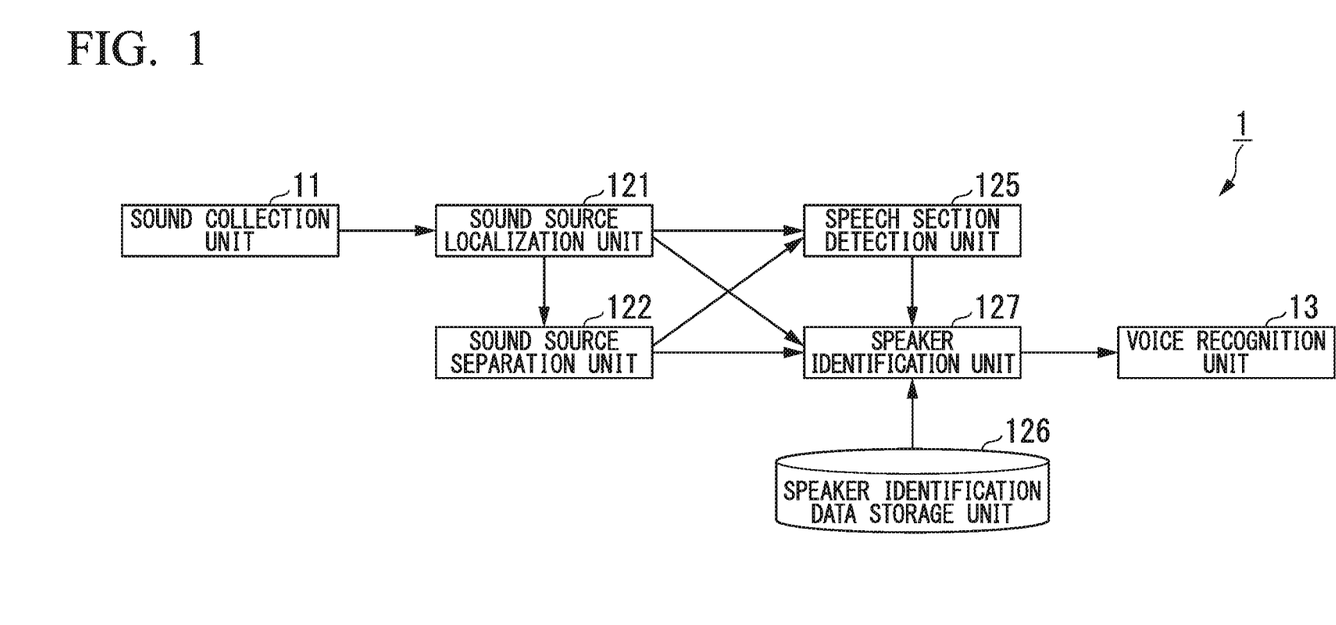
FIG. 1 is a block diagram showing an example of a configuration of a voice processing device according to a first embodiment.

FIG. 1 is a block diagram showing an example of a configuration of a voice processing device 1 according to the present embodiment.

The voice processing device 1 includes a sound collection unit 11, a sound source localization unit 121, a sound source separation unit 122, a speech section detection unit 125, a speaker identification data storage unit 126, a speaker identification unit 127, and a voice recognition unit 13.

The sound collection unit 11 collects sound signals of N channels (N being an integer equal to or greater than 2) and outputs the collected sound signals to the sound source localization unit 121. For example, the sound collection unit 11 is a microphone array including N microphones which are arranged at different positions. Each microphone collects sound signals of one channel. The sound collection unit 11 may transmit collected sound signals in a wireless or wired manner. The position of the sound collection unit 11 may be fixed or the sound collection unit 11 may be provided to a mobile body such as a vehicle, an airplane or a robot such that the sound collection unit 11 can be moved. The sound collection unit 11 may be integrated with the voice processing device 1 or may be a separate body.

The sound source localization unit 121 performs a sound source localization process for each frame having a predetermined length (e.g., 50 ms) with respect to the sound signals of the N channels input from the sound collection unit 11 to estimate directions of a maximum of M (M being an integer equal to or greater than 1 and smaller than N) sound sources. For example, the sound source localization process is a multiple signal classification (MUSIC) method. The MUSIC method is a technique of calculating a MUSIC spectrum as a spatial spectrum indicating an intensity distribution over directions and determining a direction in which the calculated MUSIC spectrum is maximized as a sound source direction, as will be described below. The number of sound sources detected by the sound source localization unit 121 is any one between 0 and M. The sound source localization unit 121 outputs sound source localization information indicating a sound source direction estimated in the section and the sound signals of the N channels to the sound source separation unit 122. The sound source localization unit 121 outputs the sound source localization information in a section to the speech section detection unit 125 and the speaker identification unit 127.

The sound source separation unit 122 performs a sound source separation process for the sound signals of the N channels using a transfer function of each sound source direction indicated by the sound source localization information input from the sound source localization unit 121. The sound source separation unit 122 uses the geometric-constrained high-order decorrelation-based source separation (GHDSS) method, for example, as the sound source separation process. The sound source separation unit 122 specifies a transfer function according to the sound source direction indicated by the sound source localization information from a set of predetermined transfer functions for each direction and calculates an initial value of a separation matrix (referred to as an initial separation matrix) on the basis of the specified transfer function. The sound source separation unit 122 adaptively calculates the separation matrix such that a predetermined cost function calculated from the transfer function and the separation matrix decreases. The sound source separation unit 122 multiplies an input signal vector having a sound signal of each channel as an element by the calculated separation matrix to calculate an output signal vector. Elements of the calculated output signal vector correspond to signals for respective sound sources. The sound source separation unit 122 outputs the signals for respective sound sources for each sound source to the speech section detection unit 125 and the speaker identification unit 127.

The speech section detection unit 125 detects a speech section in which the number of speakers is 1 on the basis of the sound source localization information input from the sound source localization unit 121 and the signals for respective sound sources input from the sound source separation unit 122. Hereinafter, the speech section in which the number of speakers is 1 will be referred to as a single speaker speech section. Here, the speech section detection unit 125 performs speech section detection for each frame with respect to the signals for respective sound sources. Speech section detection is referred to as voice activity detection (VAD). The speech section detection unit 125 determines a section in which the number of speakers as detected sound sources is 1 as a single speaker speech section among detected speech sections. The speech section detection unit 125 generates speech section information indicating whether each sound source and each period correspond to a speech section for each sound source and each frame, and single speech section information indicating whether each frame is a single speaker speech section for each frame.

The speech section detection unit 125 outputs the generated speech section information and the single speech section information to the speaker identification unit 127.

The speaker identification data storage unit 126 stores speaker identification data used for speaker identification. For example, the speaker identification data includes sound models indicating characteristics of speech voices of pre-registered speakers. For example, the sound models are Gaussian mixture models (GMM; Mixed Gaussian distribution model). Meanwhile, a speaker who has been registered will be referred to as a registered speaker in the following description. A sound model of each speaker is referred to as a speaker model.

The signals for respective sound sources from the sound source separation unit 122 and the speech section information and the single speech section information from the speech section detection unit 125 are input to the speaker identification unit 127.

The speaker identification unit 127 identifies speech sections of each sound source with reference to the speech section information and further identifies a single speech section among the identified speech sections with reference to the single speech section information. The speaker identification unit 127 performs speaker identification for signals for respective sound sources within a single speech section identified with respect to the corresponding sound source among signals for respective sound sources. The speaker identification unit 127 calculates sound feature quantities with respect to the signals for respective sound sources for each frame when performing speaker identification. For example, sound feature quantities are Mel-frequency cepstrum coefficients (MFCC). The speaker identification unit 127 calculates a likelihood for each registered speaker with respect to sound feature quantities calculated with reference to the speaker identification data stored in the speaker identification data storage unit 126. The speaker identification unit 127 determines that a registered speaker corresponding to a maximum calculated likelihood which is higher than a predetermined likelihood threshold value is a speaker as a sound source according to the signals for respective sound sources. The speaker identification unit 127 may determine the speaker as a new speaker different from any registered speaker when the maximum calculated likelihood is equal to or lower than the predetermined threshold value. The speaker identification unit 127 generates a sound model using a sound feature quantity of a sound source determined as a new speaker, associates the generated sound model with speaker identification information indicating the new speaker and adds the sound model associated with the speaker identification information to the speaker identification data.

Meanwhile, a single speech section may become a portion of one speech section and thus does not occupy the entire speech section. In such a case, speakers within the remaining section of the speech section are not specified. The remaining section corresponds to a section in which a plurality of sound sources are detected. In the following description, this remaining section will be referred to as a multi-speech section. Meanwhile, a direction of a speaker does not considerably change within a short time. Accordingly, the speaker identification unit 127 may specify a direction of a speaker corresponding to a sound source in a single speech section with reference to the sound source localization information input from the sound source localization unit 121. The speaker identification unit 127 determines a speaker in a direction within a predetermined range from the specified direction in the single speech section as the same speaker as the speaker in the single speech section among a plurality of speakers in a multi-speech section.

In addition, when a speech section of a certain speaker includes a single speech section and a multi-speech section, the speaker identification unit 127 may determine a speaker identified with respect to the single speech section as a speaker of the entire speech section.

The speaker identification unit 127 associates a signal for each sound source for each speech section with speaker information indicating a speaker identified with respect to the signal for each sound source and outputs the signal associated with the speaker information to the voice recognition unit 13.

Signals for respective sound sources for each speech section from the speaker identification unit 127 are associated with speaker information and input to the voice recognition unit 13. The voice recognition unit 13 performs a voice recognition process on the signals for respective sound sources for each speech section input from the speaker identification unit 127 to generate speech data indicating the contents of speech which is a recognition result. Here, the voice recognition unit 13 calculates a sound feature quantity for each frame with respect to the signals for respective sound sources, calculates a first likelihood for each possible phoneme sequence using a sound model preset for the calculated sound feature quantity, and determines candidates for a predetermined number of phoneme sequences in descending order of first likelihood. For example, the sound model is the Hidden Markov Model (HMM). The voice recognition unit 13 calculates a second likelihood for candidates for sentences indicating the contents of speech corresponding to the determined phoneme sequence candidates using a predetermined language model for each phoneme sequence candidate. For example, the language model is the n-gram. The voice recognition unit 13 calculates a total likelihood by combining the first likelihood and the second likelihood for each sentence candidate and determines a sentence candidate having a maximum total likelihood as the contents of speech.

The voice recognition unit 13 may integrate speech data indicating the contents of speech determined for each speech section in the order of time for each speaker indicated by speaker information of the speech section. For example, the voice recognition unit 13 stores the integrated speech data in a data storage unit (not shown) included in the voice processing device 1. The speech data for each speaker stored in the order of time is created as minutes. The voice recognition unit 13 may display a text indicating the contents of speech for each speaker on a display unit (not shown) connected to the voice processing device 1 or output the text to an apparatus separate from the voice processing device 1 in a wireless or wired manner.

(Relationship Between Sound Source Localization and Speaker Identification)

Next, a relationship between sound source localization and speaker identification in the present embodiment will be described.

Figure 2:
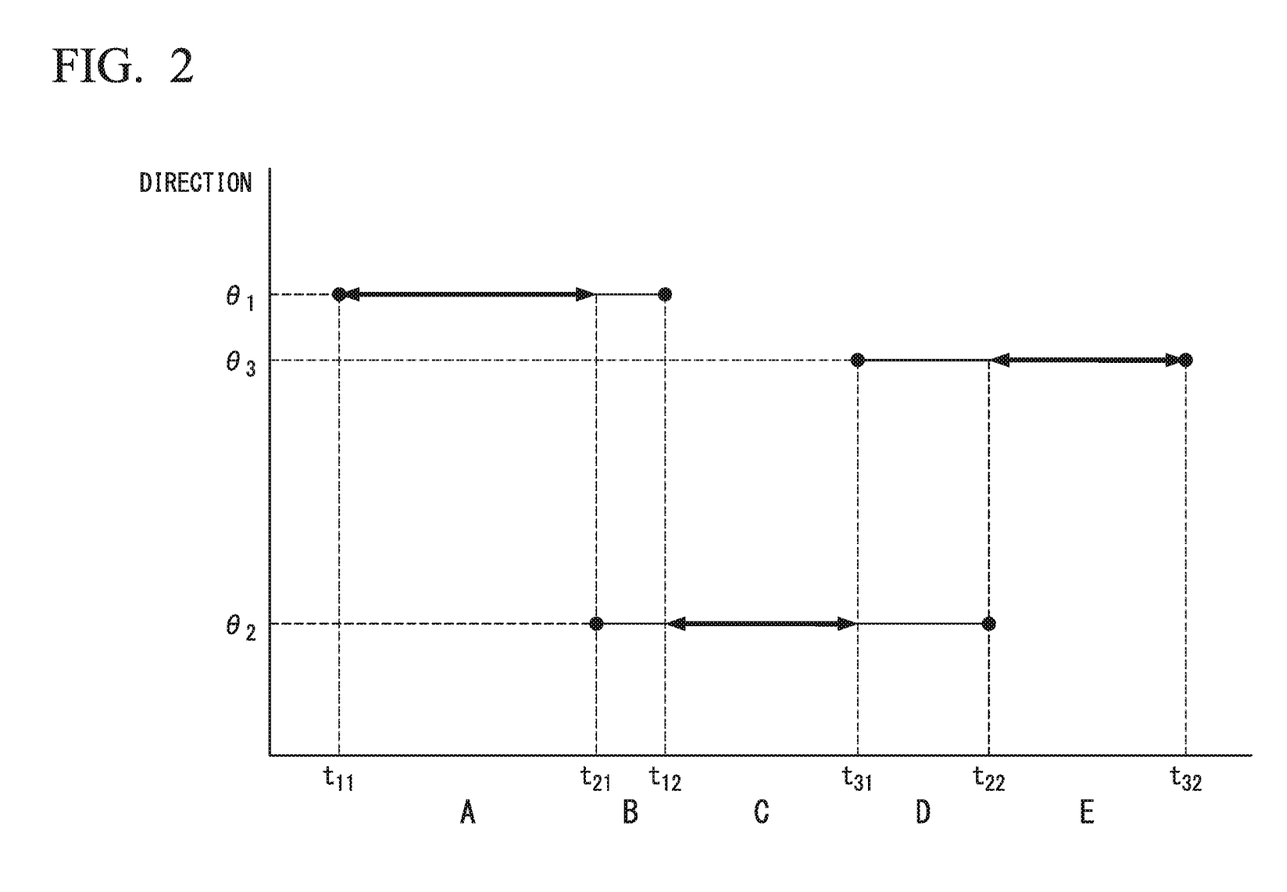
FIG. 2 is a diagram showing an example of a relationship between a direction of a speaker and a speech section.

The sound source localization unit 121 determines a direction of each of a maximum of M sound sources using sound signals of N channels collected by the sound collection unit 11. In other words, the sound source localization unit 121 detects a maximum of M sound sources in a sound environment during the sound source identification process. The sound source separation unit 122 performs the sound source separation process on the sound signals of the N channels to acquire signals for respective sound sources which indicate sound source components arriving from respective detected sound sources. In a situation in which speakers are speaking, a direction of a specified sound source becomes a direction of each speaker. In the example of FIG. 2, directions of speaker ids: 1, 2, 3 detected by the sound source localization unit 121 in a section from time $t_{11}$ to time $t_{12}$, a section from time $t_{21}$ to time $t_{22}$, and a section from time $t_{31}$ to time $t_{32}$ are $\theta_1$, $\theta_2$ and $\theta_3$. The number of speakers detected in the section A from time $t_{11}$ to time $t_{12}$, the section C from time $t_{21}$ to time $t_{22}$, and the section E from time $t_{31}$ to time $t_{32}$ is 1. That is, the sections A, C and E are single speech sections. In these single speech sections, the speaker identification unit 127 performs speaker identification based on sound feature quantities. In a single speech section, mixing of components from other sound sources with a signal for each sound source of the corresponding speaker and distortion of voice components due to sound source separation are inhibited, and thus the speaker identification unit 127 can correctly identify the speaker.

On the other hand, the number of speakers detected in a section B from time $t_{21}$ to time $t_{12}$ and a section D from time $t_{31}$ to time $t_{22}$, is 2. That is, the sections B and D are multi-speech sections. In a multi-speech section, a signal for each sound source of the corresponding speaker is mixed with components from other sound sources, and thus a speaker is more likely to be erroneously determined. The speaker identification unit 127 does not perform speaker identification based on sound feature quantities in multi-speech sections and thus deterioration of speaker identification accuracy can be avoided.

(Speaker Identification Based on Direction)

A sound feature quantity generally depends on phonemes constituting the contents of speech. Accordingly, with respect to signals for respective sound sources of a certain speaker, a likelihood calculated using a speaker model of one registered speaker varies according to change in the contents of speech. Although reduction of variation in the likelihood by lengthening a unit section in which speaker identification is performed once may be conceived, it is impossible to follow speaker switching when one unit section becomes longer than one speech section, for example.

Accordingly, the speaker identification unit 127 may estimate that speakers of a speech section in which directions distributed within a predetermined range $\Delta\theta$ are detected as a direction of a speaker detected by the sound source localization unit 121 are the same speaker. In the example of FIG. 2, the direction $\theta_1$ of the speaker detected in the section A and the section B approximates to the direction $\theta_2$ of the speaker detected in the section D and the section E and is separated from the direction $\theta_3$ detected in the section C. In this case, the speaker identification unit 127 estimates that the speaker detected in the direction $\theta_1$ is the same as the speaker detected in the direction $\theta_3$. More specifically, the speaker identification unit 127 estimates that the speaker in the section A in which the direction $\theta_1$ is detected is the same as the speaker in the section E in which the direction $\theta_3$ is detected and estimates that the speaker in the section A is different from the speaker in the section C in which direction $\theta_2$ is detected.

Accordingly, it is possible to improve speaker identification accuracy in consideration of the fact that a direction of a speaker does not considerably vary within a short time. For example, the length of an estimation period in which speakers are estimated as the same speaker may be the same as a time for which a person passes through an allowable error range of directions detected through sound source localization according to an ordinary action such as walking.

In the example of FIG. 2, the speech section of the speaker id: 1 identified as the direction $\theta_1$ through sound source localization covers the section A and the section B. The section B is a multi-speech section which overlaps the speech section of speaker id: 2. Accordingly, the speaker identification unit 127 can specify that the speaker corresponding to the sound source identified as the direction $\theta_1$ in the section B is the speaker id: 1 determined in the section A which is a single speech section.

In the same manner, the speaker identification unit 127 can identify that the speaker corresponding to the sound source identified as the direction $\theta_2$ in the section B and the section D is the speaker id: 2 determined in the section C which is a single speech section. The speaker identification unit 127 can specify that the speaker corresponding to the sound source identified as the direction $\theta_3$ in the section E is the speaker id: 3 determined in the section C which is a single speech section. Accordingly, it is determined that all of sound sources identified as the direction $\theta_1$ in the sections A and B and sound sources identified as the direction $\theta_3$ in the sections D and E are identical.

Meanwhile, the speaker identification unit 127 may calculate likelihoods on the basis of sound feature quantities in single speech sections included in speech sections which are estimated to correspond to the same speaker with reference to speaker identification data. In the example of FIG. 2, the speaker identification unit 127 calculates likelihoods on the basis of a time series of sound feature quantities calculated in the section A and the section E which are single speech sections. In addition, the speaker identification unit 127 may determine a registered speaker with a maximum likelihood which is calculated as the same speaker. Accordingly, the speaker identification unit 127 can specify whether a speaker estimated to be the same speaker is any one of registered speakers with higher accuracy.

(Sound Source Localization Process)

Next, a sound source localization process using the MUSIC method will be described as an example of the sound source localization process.

The sound source localization unit 121 performs discrete Fourier transform on a sound signal of each channel input from the sound collection unit 11 in units of frames to calculate a transform coefficient transformed into the frequency domain. The sound source localization unit 121 generates an input vector x having transform coefficients of respective channels as elements for each frequency. The sound source localization unit 121 calculates a spectrum correlation matrix $R_{sp}$ represented by Equation (1) on the basis of the input vector.

$$R_{sp}=E[xx^*] \qquad (1)$$

In Equation (1), * indicates a complex conjugate dislocation operator. E( . . . ) indicates an expected value of . . . .

The sound source localization unit 121 calculates an eigenvalue $\lambda_i$ and an eigenvector $e_i$ which satisfy Equation (2) for the spectrum correlation matrix $R_{sp}$.

$$R_{sp}e_i=\lambda_i e_i \qquad (2)$$

The index i is an integer equal to or greater than 1 and equal to or smaller than N. In addition, the order of the indices i is the descending order of the eigenvalues $\lambda_i$ The sound source localization unit 121 calculates a spatial spectrum $P(\theta)$ represented by (3) on the basis of a transfer function vector $d(\theta)$ set thereto and the eigenvector $e_i$. The transfer function vector $d(\theta)$ is a vector having a transfer function from a sound source located in the sound source direction $\theta$ to a microphone of each channel as an element.

$$P(\theta) = \frac{|d^*(\theta)d(\theta)|}{\sum_{i=M+1}^{K} |d^*(\theta)e_i|} \quad (3)$$

In Equation (3), | . . . | indicates the absolute value of . . . and M is a predetermined positive integer value less than N and indicates a maximum number of detectable sound sources. K is the number of eigenvectors $e_i$ saved in the sound source localization unit 121. M is a positive integer value less than N. That is, eigenvector $e_i$ (M+1≤i≤K) is a vector value according to a component other than significant sound sources, for example, a noise component. Accordingly, the spatial spectrum $P(\theta)$ indicates the ratio of components arriving from sound sources to components other than significant sound sources.

The sound source localization unit 121 calculates a signal-to-noise (S/N) ratio for each frequency band on the basis of a sound signal of each channel and selects a frequency band k having a calculated S/N ratio higher than a predetermined threshold value.

The sound source localization unit 121 performs weighting addition on a spatial spectrum $P_k(\theta)$ in the frequency band k using the square root of a maximum eigenvalue $\lambda_{max}(k)$ among eigenvalues $\lambda_i$ calculated for respective frequencies in the selected frequency band k to calculate an extended spatial spectrum $P_{ext}(\theta)$ represented by Equation (4).

$$P_{ext}(\theta) = \frac{1}{|\Omega|} \sum_{k<\Omega} \sqrt{\lambda_{max}(k)}\, P_k(\theta) \quad (4)$$

In Equation (4), $\Omega$ indicates a set of frequency bands. $|\Omega|$ indicates the number of frequency bands in the set. Accordingly, the extended spatial spectrum $P_{ext}(\theta)$ has relatively fewer noise components and reflects characteristics of a frequency band having a large spatial spectrum $P_k(\theta)$ value.

The extended spatial spectrum $P_{ext}(\theta)$ corresponds to the aforementioned spatial spectrum.

The sound source localization unit 121 selects a direction $\theta$ in which the extended spatial spectrum $P_{ext}(\theta)$ is equal to or greater than a threshold value given as a set sound source detection parameter and has a peak value (maximum value) between directions. The selected direction $\theta$ is estimated as a sound source direction. In other words, a sound source located in the selected direction $\theta$ is detected. The sound source localization unit 121 selects peak values of the extended spatial spectrum $P_{ext}(\theta)$ from the maximum value to the M-th largest peak values, and selects sound source directions corresponding to the selected peak values. The sound source localization unit 121 outputs sound source localization information indicating the selected sound source directions to the sound source separation unit 122, the speech section detection unit 125 and the speaker identification unit 127.

Meanwhile, when the sound source localization unit 121 estimates a direction of each sound source, another method instead of the MUSIC method, for example, the weighted delay and sum beamforming (WDS-BF) method, may be used.

(Sound Source Separation Process)

Next, a sound source separation process using the GHDSS method will be described as an example of the sound source separation process.

The GHDSS method is a method of adaptively calculating a separation matrix W such that a cost function J(W) decreases and determining an output vector y acquired by multiplying the input vector x by the calculated separation matrix W as transform coefficients of signals for respective sound sources which indicate components of respective sound sources. The cost function J(W) is a weighted sum of a separation sharpness $J_{SS}(W)$ and a geometric constraint $J_{GC}(W)$ as represented by Equation (5).

$$J(W) = \alpha J_{SS}(W) + J_{GC}(W) \quad (5)$$

$\alpha$ indicates a weighting factor which represents a degree of contribution of the separation sharpness $J_{SS}(W)$ to the cost function J(W).

The separation sharpness $J_{SS}(W)$ is an index value represented by Equation (6).

$$J_{SS}(W) = |E(yy^* - \text{diag}(yy^*))|^2 \quad (6)$$

| . . . |² indicates the Frobenius norm. The Frobenius norm is the sum of squares of element values of a matrix. diag( . . . ) indicates a total sum of diagonal elements of a matrix . . . .

That is, the separation sharpness $J_{SS}(W)$ is an index value indicating a degree to which a component of a certain sound source is mixed with components of other sound sources.

The geometric constraint $J_{GC}(W)$ is an index value represented by Equation (7).

$$J_{GC}(W) = |\text{diag}(WD-1)|^2 \quad (7)$$

In Equation (7), I is a unit matrix. That is, the geometric constraint $J_{GC}(W)$ is an index value indicating a degree of a difference between a signal for each sound source which is an output and a sound source signal derived from a sound source.

According to the geometric constraint, both separation accuracy between sound sources and sound source spectrum estimation accuracy are improved.

The sound source separation unit 122 extracts a transfer function corresponding to a sound source direction of each sound source, which is indicated by the sound source localization information input from the sound source localization unit 121, from a predetermined set of transfer functions and integrates extracted transfer functions between sound sources and channels to generate a transfer function matrix D having the extracted transfer functions as elements. Here, each row and each column correspond to a channel and a sound source (sound source direction). The sound source separation unit 122 calculates an initial separation matrix $W_{init}$ represented by Equation (8) on the basis of the generated transfer function matrix D.

$$W_{init} = [\text{diag}(D^*D)]^{-1} D \quad (8)$$

In Equation (8), [ . . . ]⁻¹ indicates an inverse matrix of a matrix [ . . . ]. Accordingly, when D*D is a diagonal matrix in which all non-diagonal elements are zero, the initial separation matrix $W_{init}$ is a pseudo inverse matrix of the transfer function matrix D.

The sound source separation unit 122 subtracts a weighted sum of complex gradients $J'_{SS}(W_t)$ and $J'_{GC}(W_t)$ according to step sizes $\mu_{SS}$ and $\mu_{GC}$ from a separation matrix $W_t$ at the present time t to calculate a separation matrix $W_{t+1}$ at the next time t+1, as represented by Equation (9).

$$W_{t+1} = W_t - \mu_{SS} J'_{SS}(W_t) - \mu_{GC} J'_{GC}(W_t) \quad (9)$$

The component $\mu_{SS} J'_{SS}(W_t) + \mu_{GC} J'_{GC}(W_t)$ obtained through subtraction in Equation (9) corresponds to an update amount $\Delta W$. The complex gradient $J'_{SS}(W_t)$ is derived by differentiating the separation sharpness $J_{SS}$ with respect to the input vector x. The complex gradient $J'_{GC}(W_t)$ is derived by differentiating the geometric constraint $J_{GC}$ with respect to the input vector x.

In addition, the sound source separation unit 122 calculates the output vector y by multiplying the input vector x by the calculated separation matrix $W_{t+1}$. Here, the sound source separation unit 122 may calculate the output vector y by multiplying the input vector x by a separation matrix $W_{t+1}$ acquired when it is determined that the separation matrix $W_{t+1}$ has converged. For example, the sound source separation unit 122 may determine that the separation matrix $W_{t+1}$ has converged when the Frobenius norm of the update amount $\Delta W$ becomes equal to or less than a predetermined threshold value. Otherwise, the sound source separation unit 122 may determine that the separation matrix $W_{t+1}$ has converged when the ratio of the Frobenius norm of the separation matrix $W_t$ to the Frobenius norm of the update amount $\Delta W$ becomes equal to or less than a predetermined ratio threshold value.

The sound source separation unit 122 performs inverse discrete Fourier transform on transform coefficients which are element values of each channel of the output vector y acquired for each frequency to generate signals for respective sound sources of the time domain. The sound source separation unit 122 outputs the signals for respective sound sources to the speech section detection unit 125 and the speaker identification unit 127.

(Speech Section Detection)

Next, an example of speech section detection will be described. The speech section detection unit 125 determines whether each frame is a sound section in which a power exceeds a predetermined power threshold value for the signal for each sound source. The speech section detection unit 125 counts the number of zero-crossing points in a frame determined to be a sound section. A zero-crossing point means a point at which a signal value of each sample crosses zero. That is, the number of zero-crossing points is a frequency of changing of a signal value from a negative value to a positive value or from a positive value to a negative value. The speech section detection unit 125 determines a frame in which the number of zero-crossing points is within a predetermined range (e.g., 200 to 500 per second) to be a speech section and determines other frames to be non-speech sections.

(Speaker Identification Process)

Figure 3:
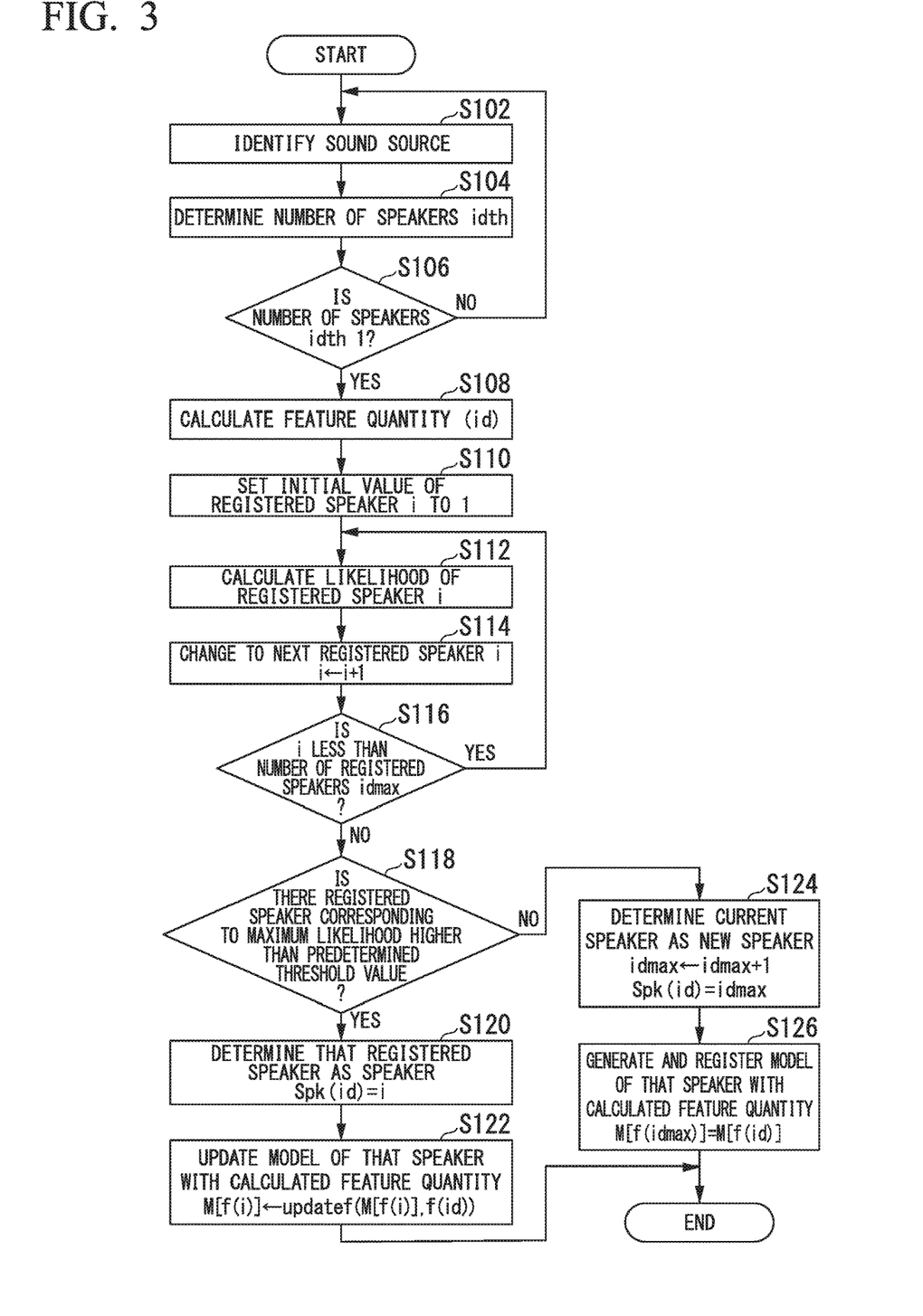
FIG. 3 is a diagram showing an example of a speaker identification process according to the first embodiment.

Next, a speaker identification process according to the present embodiment will be described. FIG. 3 is a diagram showing an example of the speaker identification process according to the present embodiment. Here, it is assumed that speaker models of registered speakers i corresponding to idmax are stored in advance as speaker identification data.

(Step S102) The sound source localization unit 121 performs the sound source localization process on sound signals of N channels from the sound collection unit 11 to estimate directions of a maximum of M sound sources. Then, the process proceeds to step S104.

(Step S104) The speech section detection unit 125 determines the number of sound sources, idth, as the number of speakers on the basis of sound source localization information indicating the direction of each sound source detected by the sound source localization unit 121. Then, the process proceeds to step S106.

(Step S106) The speech section detection unit 125 determines whether the determined number of sound sources, idth, is 1. When it is determined that idth is 1 (YES in step S106), the process proceeds to step S108. When it is determined that idth is not 1 (NO in step S106), the process returns to step S102.

(Step S108) The speaker identification unit 127 calculates a sound feature quantity f(id) for a signal for each sound source of a speaker id as a sound source detected in a single speech section. Then, the process proceeds to step S110.

(Step S110) The speaker identification unit 127 sets an initial value of an index i indicating each registered speaker to 1. Then, the process proceeds to step S112.

(Step S112) The speaker identification unit 127 calculates likelihoods from sound feature quantities f(id) with reference to speaker models of registered speakers i. Then, the process proceeds to step S114.

(Step S114) The speaker identification unit 127 changes a registered speaker i who is a likelihood calculation target to the next registered speaker i+1 for whom a likelihood is not calculated (i←i+1). Then, the process proceeds to step S116.

(Step S116) The speech section detection unit 125 determines whether i is less than the number of registered speakers, idmax. That is, the speech section detection unit 125 determines whether likelihoods have been calculated for all registered speakers. When it is determined that i is less than the number of registered speakers, idmax (YES in step S116), the process returns to step S112. When it is determined that i has reached the number of registered speakers, idmax (NO in step S116), the process proceeds to step S118.

(Step S118) The speaker identification unit 127 determines whether there is a registered speaker i for which a maximum likelihood higher than a predetermined likelihood threshold value has been calculated. When it is determined that there is such a registered speaker i (YES in step S118), the process proceeds to step S120. When it is determined that there is not such a registered speaker i (NO in step S118), the process proceeds to step S124.

(Step S120) The speaker identification unit 127 determines the registered speaker i as a speaker Spk(id) who is speaking at that time. Then, the process proceeds to step S122.

(Step S122) The speaker identification unit 127 updates the speaker model M[f(i)] of the registered speaker i using the calculated sound feature quantities f(id). Then, the process of FIG. 3 ends.

(Step S124) The speaker identification unit 127 determines the speaker Spk(id) who is speaking at that time as a new speaker idmax (idmax←idmax+1). Then, the process proceeds to step S126.

(Step S126) The speaker identification unit 127 generates the speaker model M[f(idmax)] of the speaker idmax using the calculated sound feature quantities f(id) and stores (registers) the generated speaker model M[f(idmax)] in the speaker identification data storage unit 126. Then, the process of FIG. 3 ends.

When the speaker identification unit 127 generates or updates a GMM as a speaker model, the speaker identification unit 127 calculates configuration parameters such that a likelihood is maximized for the corresponding speaker (learning). The GMM is a statistic model for calculating an output probability with respect to a sound feature quantity calculated for each frame by weighting adding a plurality of (e.g., 256 normal distributions) Gaussian functions thereto. That is, the GMM represents statistics such as a mixed weighting factor, a mean value and a covariance matrix as configuration parameters. The mixed weighting factor represents a degree of contribution of each base to the output probability. The mean value and the covariance matrix represent the origin of each base and a distribution of sound feature quantities around the origin. A likelihood corresponds to a total sum of output probabilities within a predetermined period until that time point.

When the GMM is updated, the speaker identification unit 127 may perform an update process using maximum likelihood linear regression (MLLR) for the GMM M[f(id)] of the speaker id before update using the sound feature quantity f(id) of the speaker id. In addition, when the GMM M[f (idmax)] of the new speaker idmax is generated, the speaker identification unit 127 may also perform the update process using MLLR for a GMM M[f(i_max)] of a speaker i_max corresponding to a maximum likelihood using the sound feature quantity f(id) of the speaker id. Accordingly, it is possible to rapidly update or generate the GMM using samples of a relatively small amount of sound feature quantities.

As described above, the voice processing device 1 according to the present embodiment includes the sound source localization unit 121 which determines a direction of each sound source on the basis of voice signals of a plurality of channels, and the sound source separation unit 122 which separates signals for respective sound sources indicating components of the respective sound sources from the voice signals of the plurality of channels. In addition, the voice processing device 1 includes the speech section detection unit 125 which detects a speech section in which the number of speakers is 1 from signals for respective sound sources, and the speaker identification unit 127 which identifies a speaker on the basis of the signals for respective sound sources in the detected speech section.

According to this configuration, a speaker is identified on the basis of signals for respective sound sources in a speech section in which the number of speakers is 1 and components of speech voices of other speakers are not mixed therewith. In addition, distortion with respect to components of speech voice due to sound source separation does not occur in a speech section in which the number of speaker is 1. Accordingly, a speaker is correctly identified.

Furthermore, the speech section detection unit 125 detects a speech section in which the number of speakers is 1 and the single speaker is identified from sections in which the number of sound sources in directions determined by the sound source localization unit 121 is 1.

According to this configuration, a section in which a single speaker is speaking is identified in response to speech state variation even in a situation in which a plurality of speakers are present. Accordingly, a larger number of sections as sections in which speakers can be correctly identified are used for speaker identification.

In addition, the speaker identification unit 127 estimates that speakers in speech sections in which directions of sound sources determined by the sound source localization unit 121 are within a predetermined range are identical.

According to this configuration, speaker identification can be performed in consideration of the fact that a direction of a speaker does not considerably change within a short time. Accordingly, a speaker can be identified more accurately.

Furthermore, the voice processing device 1 includes the voice recognition unit 13 which performs a voice recognition process on signals for respective sound sources, and the voice recognition unit 13 provides speech information indicating the contents of speech to each speaker determined by the speaker identification unit 127.

According to this configuration, speech information indicating the contents of speech of speech voice is provided to each correctly identified speaker. Accordingly, an operation of editing the contents of speed for each speaker is reduced.

Second Embodiment

Next, a second embodiment of the present invention will be described. Differences between the first embodiment and the second embodiment will be mainly described in the following. Components the same as those in the first embodiment are denoted by the same reference signs and description thereof will be cited.

Figure 4:
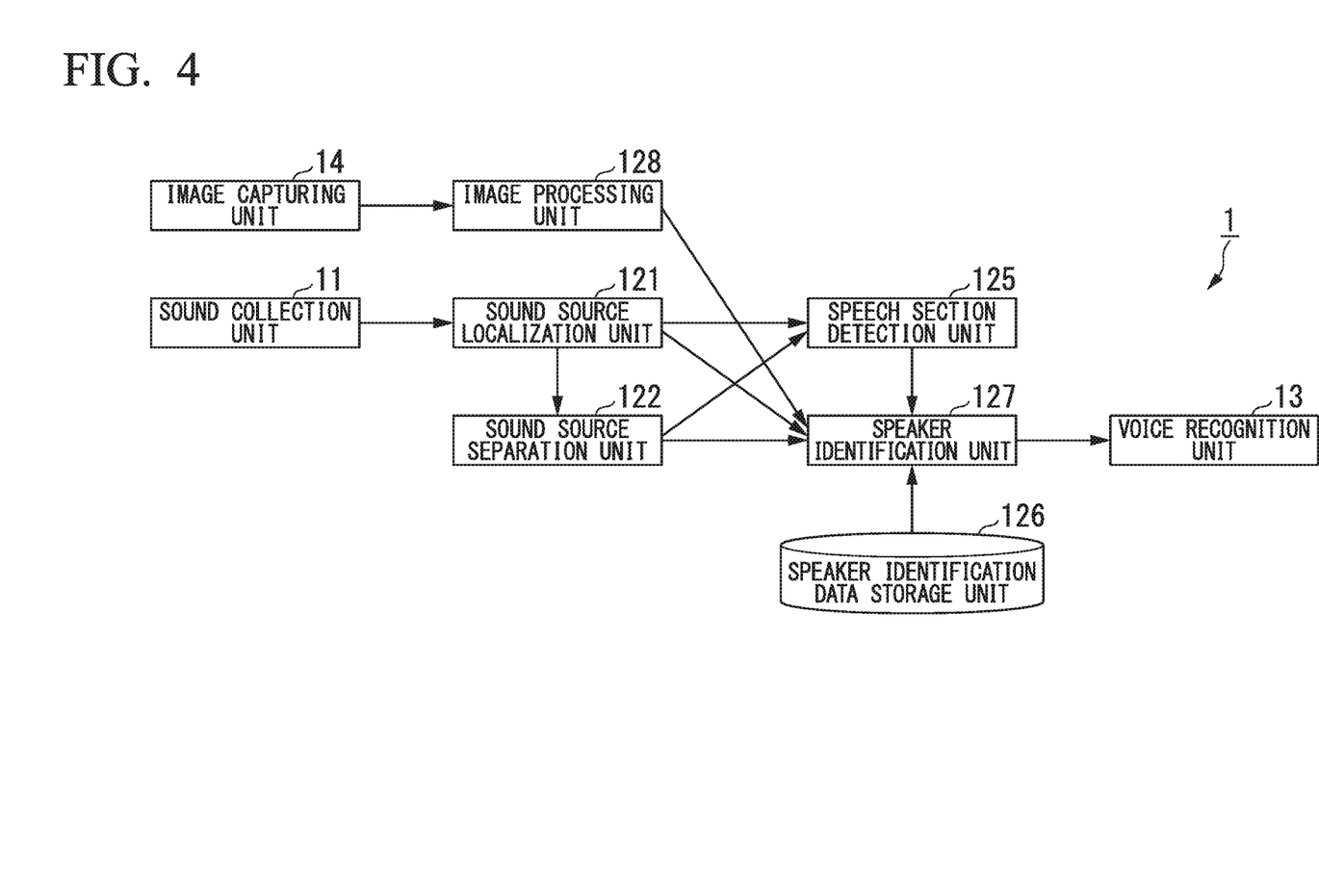
FIG. 4 is a block diagram showing an example of a configuration of a voice processing device according to a second embodiment.

FIG. 4 is a block diagram showing an example of a configuration of the voice processing device 1 according to the present embodiment.

The voice processing device 1 includes the sound collection unit 11, the sound source localization unit 121, the sound source separation unit 122, the speech section detection unit 125, the speaker identification data storage unit 126, the speaker identification unit 127, an image processing unit 128, the voice recognition unit 13, and an image capturing unit 14.

The image capturing unit 14 captures an image of a surrounding object present within a predetermined visual field at each of predetermined time intervals (e.g., every 1/30 s). For example, the image capturing unit 14 is a camera included in a portable terminal device constituting the voice processing device 1. The image capturing unit 14 outputs an image signal indicating the captured image of the surrounding object to the image processing unit 128.

The image processing unit 128 performs an image recognition process on the image signal input from the image capturing unit 14 to specify a portion which represents a person. For example, the image processing unit 128 extracts a contour in which spatial variations of pixel values exceed a predetermined variation with respect to the image signal and specifies an object region in which an individual object having a contour as an outer edge is represented. The image processing unit 128 determines whether the represented object is a human face using a predetermined image recognition process with respect to the specified object region.

The image processing unit 128 calculates a histogram of gradient (HOG) feature quantity, for example, as an image feature quantity for each region obtained by further dividing each object region. The image processing unit 128 determines whether the object represented in the object region is a person using Adaboost, for example, as an image recognition method with respect to HOG feature quantities calculated within the object region. In Adaboost, a predetermined identification value is calculated on the basis of an HOG feature quantity of a face of a person calculated according to previous learning and an HOG feature quantity calculated in the object region. The identification value is preferably a threshold value indicating a probability of the object being a person. In addition, when the probability of the object represented in the object region being a person on the basis of the calculated identification value is equal to or greater than a predetermined probability threshold value, the image processing unit 128 determines that the object is a person. The image processing unit 128 determines that the object is not a person when the probability is less than the probability threshold value.

The image processing unit 128 calculates a center point, for example, as a representative point of the object region in which the person is represented. In addition, the image processing unit 128 calculates a direction of the person using an image coordinate system with reference to an image on the basis of coordinates of the representative point in the image. The image processing unit 128 converts the calculated direction of the person according to the image coordinate system into a direction of the person according to a collected sound coordinate system with reference to microphone arrangement of the sound collection unit 11. In the image coordinate system, the center point of the image corresponds to the direction of an optical axis of the image capturing unit 14 and left and right ends or upper and lower ends of the image correspond to both ends of the horizontal visual field or both ends of the vertical visual field. The image processing unit 128 outputs person direction information indicating the converted direction of the person to the speech section detection unit 125.

The speaker identification unit 127 may select, as a direction of a speaker, a direction of a sound source for which the direction of the person is within a predetermined range from the direction of the sound source detected by the sound source localization unit 121 with reference to the person direction information input from the image processing unit 128, and reject sound source directions outside of the range from the direction of the sound source detected by the sound source localization unit 121. In addition, the speaker identification unit 127 specifies a single speech section in which the number of speakers corresponding to sound sources in the selected direction is 1. The speaker identification unit 127 performs a speaker identification process based on sound feature quantities with respect to signals for respective sound sources within the single speech section, as described above. Accordingly, a speaker identification process based on components of sound sources arriving from directions in which speakers as sound sources are not present is avoided. In addition, since such sound sources correspond to sound sources other than speech voices of speakers, mis-registration of the sound sources as new speakers can be avoided.

Meanwhile, the speaker identification unit 127 may estimate directions in which the directions of the persons indicated by the person direction information are distributed within a predetermined range as an identical speaker in addition to the speaker direction detected by the sound source localization unit 121. Accordingly, the estimation accuracy of the same speaker is improved.

As described above, the voice processing device 1 according to the present embodiment includes the image processing unit 128 which determines a direction of a speaker on the basis of a captured image. The speaker identification unit 127 selects sound sources for which the direction of the speaker determined by the image processing unit 128 is within a predetermined range from the direction determined by the sound source localization unit 121 and detects a speech section from sections in which the number of selected sound sources is 1.

According to this configuration, a section in which a single speaker is speaking and present in a direction in which speakers are actually present is used for speaker identification. Accordingly, it is possible to avoid identification error due to utilization of sound sources other than a speaker for speaker identification. Although embodiments of the present invention have been described above in detail with reference to the drawings, specific configurations are not limited to the aforementioned ones and various design modifications and the like may be performed within a range without departing from the spirit or scope of the present invention.

For example, although a case in which the sound collection unit 11 and the image capturing unit 14 in the aforementioned embodiments and modified example are integrated with other functional units of the voice processing device 1 is assumed, the present invention is not limited thereto.

One or both of the sound collection unit 11 and the image capturing unit 14 need not necessarily be integrated with other functional units of the voice processing device 1 if various types of data can be input and output in a wireless or wired manner.

In addition, the voice processing device 1 may be a dedicated device or may be configured as a part of a device which mainly executes other functions. For example, the voice processing device 1 may be realized as a part of an electronic apparatus in addition to portable terminal devices such as a multi-function portable phone (including a so-called smartphone) and a table terminal device.

Part of the voice processing device 1 in the above-described embodiments and modified example, for example, all or some of the sound source localization unit 121, the sound source separation unit 122, the speech section detection unit 125, the speaker identification unit 127, the image processing unit 128 and the voice recognition unit 13 may be realized through a computer. In such a case, all or some of the units may be realized by recording a program for realizing a control function in a computer-readable recording medium and causing a computer system to read and execute the program recorded in the recording medium. The "computer system" described here is a computer system embedded in the voice processing device 1 and may include an OS and hardware such as a peripheral apparatus. In addition, the "computer-readable recording medium" refers to storage devices such as portable media such as a flexible disk, a magneto-optical disk, a ROM and a CD-ROM, and a hard disk embedded in a computer system. Further, the "computer-readable recording medium" may include a medium which dynamically saves a program for a short time, such as a communication line when the program is transmitted through a communication circuit such as a network such as the Internet and a telephone circuit, and a medium which saves a program for a specific time, such as a volatile memory in a computer system corresponding to a server or a client when the program is transmitted. In addition, the aforementioned program may realize some of the above-described functions and further realize the above-described functions through combination with a program recorded in a computer system.

In addition, some or all of the components of the voice processing device 1 in the above-described embodiments and modified example may be realized by an integrated circuit such as a large scale integration (LSI). Each functional block of the voice processing device 1 may be individually configured as a processor or some or all of the blocks may be integrated into a processor. Furthermore, the circuit integration technique is not limited to an LSI and an integrated circuit may be realized as a dedicated circuit or a general-purpose processor. Moreover, when a circuit integration technology which replaces LSI emerges with the progress of semiconductor technology, integrated circuits according to the technology may be used.

What is claimed is:

1. A voice processing device, comprising:
a sound source localization unit configured to determine a direction of each sound source on the basis of voice signals of a plurality of channels;
a sound source separation unit configured to separate signals for respective sound sources indicating components of respective sound sources from the voice signals of the plurality of channels;
a speech section detection unit configured to detect speech sections from the signals for respective sound sources and to determine a speech section in which a number of speakers is 1 among the speech sections as a single speech section; and
a speaker identification unit configured to identify a speaker on the basis of the signals for respective sound sources in the single speech section.

2. The voice processing device according to claim 1, wherein the speech section detection unit detects the single speech section from sections in which a number of sound sources, of which directions are determined by the sound source localization unit, is 1.

3. The voice processing device according to claim 1, wherein the speaker identification unit estimates speakers of the speech sections, in which directions of sound sources determined by the sound source localization unit are within a predetermined range from a direction of a sound source identified in the single speech section, to be identical to the speaker of the single speech section.

4. The voice processing device according to claim 1, comprising an image processing unit configured to determine a direction of a speaker on the basis of a captured image,
wherein the speaker identification unit selects sound sources, for which the direction of the speaker determined by the image processing unit is within a predetermined range, from a direction of each sound source determined by the sound source localization unit and detects the single speech section from sections in which a number of selected sound sources is 1.

5. The voice processing device according to claim 1, comprising a voice recognition unit configured to perform a voice recognition process on the signals for respective sound sources,
wherein the voice recognition unit provides speech information indicating contents of speech to each speaker determined by the speaker identification unit.

6. The voice processing device according to claim 1, wherein the speaker identification unit estimates speakers of the speech sections, in which directions of sound sources determined by the sound source localization unit are within a predetermined range from a direction of a sound source identified in the single speech section and which are out of the single speech section, to be identical to the speaker of the single speech section.

7. The voice processing device according to claim 1, wherein the speaker identification unit calculates a likelihood for each registered speaker with respect to sound feature quantities of the signals for respective sound sources in the single speech section with reference to speaker identification data of registered speakers stored in advance in a speaker identification data storage unit and identifies a speaker on the basis of the calculated likelihood.

8. A voice processing method in a voice processing device, comprising:
a sound source localization step of determining a direction of each sound source on the basis of voice signals of a plurality of channels;
a sound source separation step of separating signals for respective sound sources indicating components of respective sound sources from the voice signals of the plurality of channels;
a speech section detection step of detecting speech sections from the signals for respective sound sources and determining a speech section in which a number of speakers is 1 among the speech sections as a single speech section; and
a speaker identification step of identifying a speaker on the basis of the signals for respective sound sources in the single speech section.

9. A non-transitory computer-readable storage medium storing a program for causing a computer of a voice processing to execute:
a sound source localization process of determining a direction of each sound source on the basis of voice signals of a plurality of channels;
a sound source separation process of separating signals for respective sound sources indicating components of respective sound sources from the voice signals of the plurality of channels;
a speech section detection process of detecting speech sections from the signals for respective sound sources and determining a speech section in which a number of speakers is 1 among the speech sections as a single speech section; and
a speaker identification process of identifying a speaker on the basis of the signals for respective sound sources in the single speech section.

* * * * *